Jan. 16, 1968 G. R. WINDERS ET AL 3,364,120
NUCLEAR CONTROL ROD ACTUATOR
Filed Jan. 24, 1966 3 Sheets-Sheet 2

United States Patent Office 3,364,120
Patented Jan. 16, 1968

3,364,120
NUCLEAR CONTROL ROD ACTUATOR
Gordon R. Winders, Kenneth C. Litt, and John S. Dossett, Lynchburg, Va., assignors to The Babcock & Wilcox Company, New York, N.Y., a corporation of New Jersey
Filed Jan. 24, 1966, Ser. No. 522,524
10 Claims. (Cl. 176—36)

This invention relates in general to a nuclear control rod actuator, and more specifically to a hydraulically operated, fail-safe, control rod actuator for moving a control rod containing a neutron poison material into or out of a nuclear reactor core.

A self-sustaining nuclear chain reaction utilizes neutrons which cause atoms of a nuclear fuel material to fission, releasing additional neutrons and other energy which may be utilized for useful purposes. The power generated by a nuclear reactor is determined by the arrangement and amount of nuclear fuel within the reactor core. The power level may be regulated by varying the number of neutrons available for sustaining the chain reaction, the available neutrons being determined by the number of neutrons generated by the fissioning of the fuel material minus the neutrons lost from the periphery of the reactor and those absorbed non-reproductively by the structural material within the core and the neutron poison material introduced into the core for control purposes.

The neutron poison material is generally arranged in control rods which are movably positionable within the core. Thus, as the control rods are moved into the core more poison material is introduced and the power level of the reactor is reduced and, in many reactors, full insertion of all of the control rods terminates the chain reaction. Conversely, as the control rods are withdrawn from the core, less poison material is present to reduce the number of neutrons available to continue the chain reaction and the power level is increased. Thus, both the regulation of power produced and the termination of the chain reaction are accomplished by the same control rods.

Control rod actuators of the prior art generally have been located outside of the reactor pressure vessel so that the drive components were not subjected to the high temperature and high radiation environment within the reactor itself. However, the development of higher temperature and higher pressure reactors has increased the problems associated with the precise alignment of the exterior control rod actuators and the control rods within the reactor core. This alignment problem has resulted from the utilization of dissimilar metals in the components, i.e. reactor pressure vessel and core, having widely different coefficients of thermal expansion. For example, reactor pressure vessels are normally fabricated of carbon steel having a coefficient of thermal expansion of approximately seven, while the reactor internals are normally of stainless steel, which has a coefficient of thermal expansion of about 10. Moreover, as the operating temperatures of these components are increased the misalignment problem is magnified. Furthermore, as the operating pressures of such reactors are increased, the problem of sealing the penetration of the movable control rod through the reactor pressure vessel becomes more complicated. It has accordingly become increasingly necessary to develop a control rod actuator which can be positioned within the reactor pressure vessel and, if possible, immediately adjacent the reactor core.

It has been found that the location of such control rod actuators within or adjacent the reactor core necessitates the use of a hydraulic rather than an electric actuator, since electrical insulation tends to fail when subjected to the high temperatures, pressures and radiation levels encountered within modern high pressure reactors. Moreover, penetration of the pressure vessel to accommodate electric connections has been found to be more complex than is the penetration of the pressure vessel with a hydraulic line.

Furthermore, it has been found that, for a given power requirement, hydraulic actuators are more efficient and capable of transmitting far greater amounts of power per unit volume of the actuators than are magnetically operated actuators. As a result, the hydraulic actuators of the present invention may be constructed with a volume only one quarter that necessary with magnetic actuators, resulting in far more compact arrangements and even arrangements heretofore unobtainable, with a corresponding decrease in cost but without any sacrifice of safety or effectiveness.

It has previously been considered undesirable to utilize hydraulically driven control rod actuators because of the fear that a rupture in the reactor primary ssytem piping could depressurize the system, thereby creating an abnormally high pressure drop across the core, and thus across the control rod, which would drive out any control rods that were in the core at that time and produce an uncontrolled surge of reactivity just at the time the reactor should be scrammed. Moreover, it has been feared that a failure in the actuating fluid supply would cause the control rod actuator to move the control rod through its entire length of travel.

The use of hydraulically operated rotating motors as control rod actuators within the reactor pressure vessel has been contemplated as a solution to the foregoing problems. However, such actuators must be capable of operating for extended periods of time without requiring maintenance. It has been found that mechanisms operating in such highly purified water environments as occur in water cooled reactors must be as simple as possible since the lubrication afforded by such pure coolants is very poor. In fact, it has been found that, in such pure water environments, coefficients of friction may be as much as ten times greater than that expected in normal environments.

Accordingly, the present invention is directed to a simple, rugged, hydraulically operated control rod actuator and to a system and method of operating an actuator which operates on a jacking principle.

Furthermore, the present invention provides a hydraulically operated control rod actuator which utilizes only a single hydraulic fluid supply line to provide all of the actuator functions. Thus the control rod may be incrementally moved into or out of the reactor core or may be scrammed into the reactor core.

In addition, the control rod actuator of the present invention requires a particular pulsed type of actuator fluid flow in order to withdraw the control rod from the reactor core. The application of a single large pulse of actuator fluid flow to the actuator will not move the control rod more than one increment. As a result, it is highly improbable that any accident could occur either to the reactor or to the actuator fluid supply that would duplicate the particular sequence of actuator flow necessary to effect control rod movement. The actuator of the present invention thus is substantially fail-safe. Moreover, with the arrangement of the present invention, should a failure occur in the reactor primary coolant circuit, there is no possibility that control rods will be moved more than one increment by the sudden pressure surge.

Accordingly, the present invention provides a nuclear control rod actuator comprising a fixed coupling means and a movable coupling means arranged to engage the control rod. The movable coupling means is connected to and driven by a fluid-actuated piston within a cylinder surrounding the control rod. Upon application of the control rod actuator fluid the movable coupling means is locked, the stationary coupling means is unlocked and the movable coupling means is moved by the action of the fluid on the piston carrying the control rod along with it. The stationary coupling means is then locked and the movable coupling means is unlocked and the piston is returned to its first position whereupon the movable coupling means again grasps the control rod.

Upon reversal of the flow of the actuator fluid both the movable and the stationary coupling means are unlocked permitting the control rod to be scrammed into the reactor core.

Figure 1:
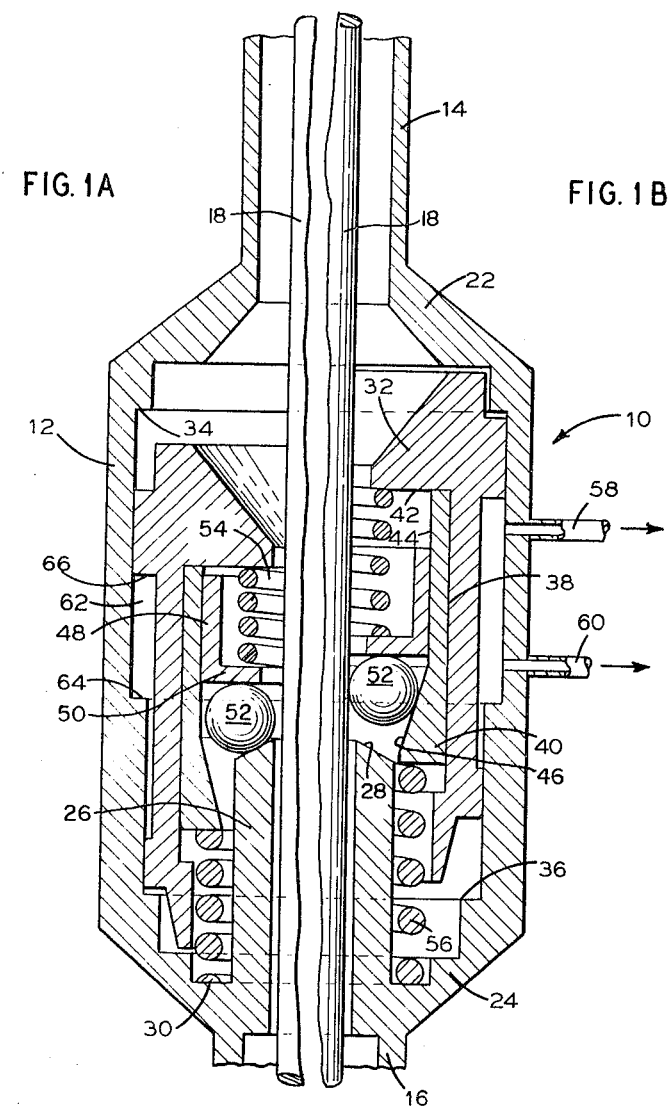
FIG. 1A is a part section illustrating a simplified version of one control rod actuator assembly according to the present invention wherein the coupling means is disconnected from the control rod.
FIG. 1B is a part section showing the coupling means engaging the control rod.

The control rod actuator 10, shown in FIGS. 1A and B, comprises a cylinder member 12 which may be suspended from the lower end of a fuel element in a reactor core by tubular member 14 or supported from the upper end of the fuel element by tubular member 16. A nuclear poison-material-bearing control rod 18, or a control rod extension, extends substantially coaxially through the tubular members 14 and 16 and cylinder 12. The cylinder is provided with end closures 22 and 24 which connect the upper and lower ends of the cylinder to tubular members 14 and 16 respectively. The lower end of the cylinder is formed with an integral re-entrant type tubular section 26 which extends upwardly into, and coaxial with, the cylinder member 12. The upper end of re-entrant member 26 is provided with a radially outwardly sloping frusto-conically shaped surface 28. The re-entrant member 26 together with the lower end 24 of the cylinder cooperate to provide an annular spring seat 30 which will be more thoroughly described hereinbelow. A hollow piston member 32 is slidably disposed within cylinder 12 and is arranged to move between an upper stop 34 and a lower stop 36 provided in the inner surface of the cylinder member. The piston member 32 is disposed coaxially about the control rod 18 and is provided with an inner cylindrical surface 38. A cylindrical retainer member 40 is coaxially disposed within the piston member 32 and extends from a spring seat 42 near the upper end thereof for substantially the entire length of surface 38. The inner surface 44 of retainer member 40 is substantially cylindrical throughout a major portion of its length and terminates in an inwardly sloping frusto-conical surface 46 at the lower end thereof. A positioning cup member 48, disposed within retainer member 40, is arranged to be slidably movable along the inner surface 44 of the member. The positioning cup member 48 has an inwardly extending lower end portion 50 which bears on a plurality of balls or rollers 52 disposed about the control rod within the retainer member 40, which balls or rollers act as coupling means between the piston 32 and the control rod 18. A spring 54 extends between spring seat 42 in the upper end of the piston and the lower end 50 of the positioning cup member and serves to retain the positioning cup member in contact with the rollers or balls 52. A second spring member 56 extends between spring seat 30 in the lower end of cylinder 12 and the lower end of retainer member 40 and operates to normally maintain the retainer member 40 and piston 32 positioned within the upper portion of cylinder 12. Two actuating fluid transfer lines 58 and 60, extending through the wall of cylinder member 12, open into an annular chamber or space 62 defined by an inwardly projecting lip 64 on the inner surface of cylinder 12 and an outwardly extending surface 66 of the piston member 32.

During operation, the control rod actuator 10 may be positioned within the reactor pressure vessel and is submerged in a body of high pressure fluid, i.e. the reactor primary coolant fluid. Tubular members 14 and 16 are open to the fluid in which the actuator is immersed so that the environment pressure, i.e. the primary coolant pressure, is imposed upon the upper and lower surfaces of piston member 32 and the associated components. However, space 62 between the outer surface of the piston and the inner surface of the cylinder is maintained at the pressure existing in the actuating fluid transfer lines 58 and 60. If the pressure within these lines is substantially equal to that of the environment pressure, piston member 32 will be held in the upper end of cylinder 12 by spring member 56 acting upon the lower surface of the retainer member 40 as shown in FIG. 1B. The conical surface 46 of retainer member 40 forces the ball members 52, which are disposed about the control rod 18, into frictional engagement with the control rod, thereby preventing axial movement of the rod.

When it is desired to move the control rod upward, a negative pressure, i.e. a pressure less than the environmental pressure, is imposed upon transfer line 58, thereby reducing the pressure in space 62 and permitting the environmental pressure to act on the upper surface of piston 32 causing it to move downwardly against the force of spring 56 since the upper surface exposed to the environmental pressure is larger than the lower surface so exposed. As the piston member 32 moves downwardly, the force exerted by the conical surface 46 of the retaining member 40 against the coupling means, i.e. balls 52, is relaxed and the control rod is released. The positioning cup member 48 with its associated actuating spring 54 assures that the balls of cylinder members 52 do not lag behind in the downward motion of the piston member so that there is a substantially instantaneous release of the control rod. As the descending piston member closes off the inlet of transfer line 58, the negative pressure is removed from space 62 so that spring 56 quickly returns the piston member and associated elements to the upper position. As the retainer member 40 moves upward, and since the positioning cup member 48 had assured that the members 52 followed the piston travel downward, the ball members 52 take a new frictional grip upon the control rod at a position below the position of previous engagement and move the control rod upwardly during the remainder of the upward stroke of the piston member. The design of the pneumatic system is such that the down and up strokes of the piston and associated components are so quickly completed that inertia prevents downward movement of the control rod during the period that the ball members are not in engagement therewith. In an arrangement where an acceleration of five times the force of gravity can be imposed upon the piston in the downward direction, tests have shown that a travel of approximately 0.4 inch of the piston will result in downward motion of the control rod of only about 0.002 inch; so that the net upward movement of the control rod is 0.398 inch for each stroke of the actuator.

If it is desired to move the control rod down, under the force of gravity or a pressure differential between the top and the bottom of the reactor, a negative pressure is imposed in transfer line 60 drawing the piston member 32 downward releasing ball members 52 from contact with the control rod and holding them away from the control rod by the action of frusto-conically shaped surface 28 on re-entrant member 26. The surface 28 assures that the coupling members 52 cannot effectively contact surface 46 of the retainer member and thus re-engage the control rod and stop its downward motion until the negative pressure in line 60 is terminated.

Figure 2:
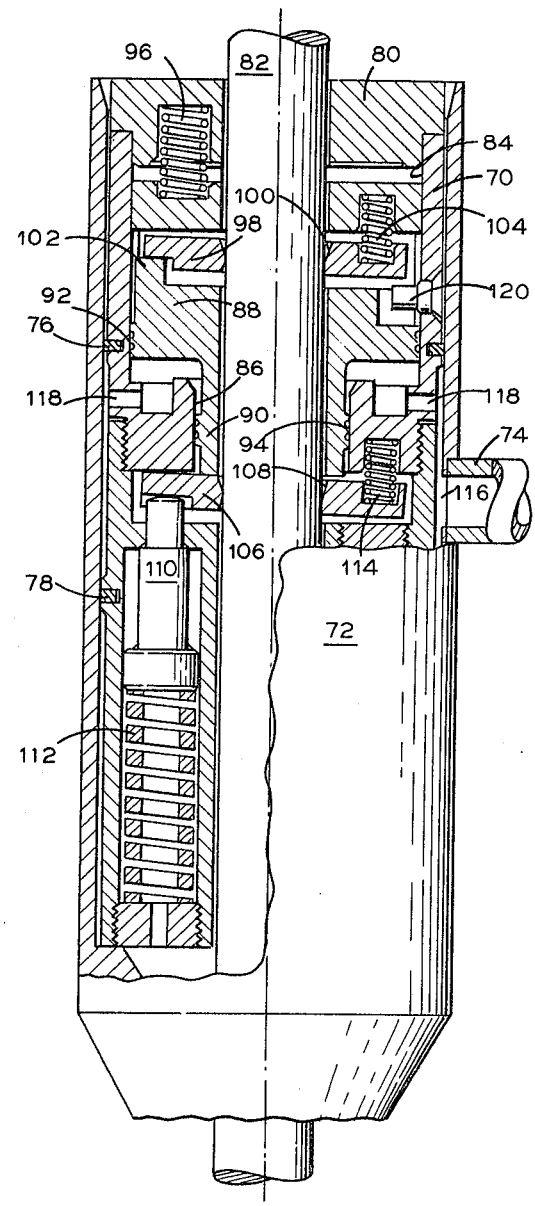
FIG. 2 is a partial section of a second embodiment of a control rod actuator assembly.

A second embodiment of the present invention is illustrated in FIG. 2 wherein the cylinder member 70 is slidably disposed within a tubular housing member 72 which is supported within the reactor. The tubular member 72 is permanently located within the reactor pressure vessel and is provided with an actuating fluid transfer line 74 which extends through one wall thereof substantially midway between the top and bottom. The cylinder member 70 is provided with a pair of sealing rings 76 and 78 which are arranged to provide a sealing fit on either side of the actuating fluid transfer line 74 when the cylinder 70 is fitted in tubular member 72. The top of cylinder member 70 is closed by a suitably secured annular plate 80 and is arranged for the passage of the control rod 82 coaxially therethrough. The cylinder member 70 is provided with an inner bore 84 throughout a substantial portion of its length, which bore is reduced at the lower end thereof at 86. The reduced portion of the bore of cylinder 70 is substantially larger than the control rod 82 which passes therethrough. A piston member 88 is disposed within bore 84 of the cylinder member and is provided with a dependent portion 90 which extends through the reduced bore 86 of the cylinder member. The piston member 88 is provided with fluid seals 92 and 94 which engage the inner surfaces 84 and 86, respectively, of the cylinder member 70. The piston member is biased toward the lower end of the cylinder member by a spring 96 disposed between the upper end of the piston and end plate 80 of the cylinder member. A first coupling means, or jacking collar, 98 is disposed within the upper portion of piston member 88 and is provided with a beveled bore 100 surrounding and arranged to engage the control rod 82. One side of the jacking collar 88 rests upon a shoulder 102 in piston 88 and the opposite side is biased downwardly by spring 104. A second coupling means, or locking collar, 106 having a beveled bore 108 is disposed around and in engagement with the control rod within cylinder member 70 below the lower end 90 of the piston 88. One side of the locking collar 106 is supported by pin 110 which is retained in position by the action of spring 112 at the lower end of cylinder 70. The opposite side of the locking collar 106 is biased downwardly by spring 114. The space 116 between tubular member 72 and cylinder 70 defined by seals 76 and 78, is supplied with actuating fluid by actuating transfer line 74 and opens via openings 118, spaced around the periphery of cylinder 70, into the space beneath piston 88 between piston seals 92 and 94. A stop pin 120 is provided through the wall of cylinder 70 and is arranged to engage the lower surface of jacking collar 98.

In operation, with the piston 88 biased downwardly by spring 96 to a neutral position, the lower end 90 of the piston contacts the upper surface of locking collar 106, which is biased upwardly by pin 110. Jacking collar 98 is pivoted around shoulder 102 by downwardly acting spring 104 so that the beveled bore 100 frictionally engages the control rod 82 preventing its downward movement. Actuating fluid, at a pressure higher than that of the environment in which the actuator is disposed, is introduced through transfer line 74 into space 116, through openings 118, and operates on the lower surface of piston 88 moving it upward against the force of spring 96. The jacking collar 98 moves upwardly with the piston and moves the control rod 82 with it. Inasmuch as upward movement of the control rod through locking collar 106 tends to lift that collar against the action of spring 114 the collar is disengaged from the control rod and so does not prevent upward motion of the control rod. When the piston reaches the upper limit of its stroke, the flow of actuating fluid is stopped and spring 96 returns the piston to the neutral starting position. As the piston moves downwardly the control rod is held stationary by engagement of the locking collar 106 therewith, while jacking collar 98 pivots around shoulder 102, compressing spring 104 so that collar 98 is disengaged and slides downwardly along the surface of the now stationary control rod. At the lower, neutral position of the piston the jacking collar 98 re-engages the control rod and the actuating fluid may again be supplied by transfer line 74 and the upward movement of the control rod resumed. Thus the supply of a pulsed actuating fluid will raise the control rod by a sequence of incremental steps until the desired position is reached at which time the actuating fluid flow is stopped.

When downward motion of the control rod is desired a negative pressure is imposed upon transfer line 74 drawing piston 88 downwardly against the force of spring 112 acting through pin 110 and locking collar 106. Thus locking collar 106 is moved downwardly disengaging the control rod; at the same time the edge of jacking collar 98 is engaged by stop pin 120 which forces that side of the jacking collar upwardly against the force of spring 104, disengaging jacking collar 98 from the control rod. The control rod is then free to move downwardly under the force of gravity and the pressure differential between the top and bottom of the reactor. If it is desired to drive the control rod completely down, the negative pressure in transfer line 74 is maintained until the control rod travel ceases. On the other hand, if it is desired only to incrementally move the control rod down, a pulsed negative pressure is applied to the transfer line until the control rod reaches the desired location.

It will be noted that this actuator embodiment may be readily inserted and withdrawn from the reactor for servicing or replacement. Since the actuator is held within tubular member 72 which is permanently positioned within the reactor and is permanently connected to the actuator fluid transfer line 74, the actuator may be removed from the reactor with the fuel element associated with each control rod 82. A new actuator could then be introduced into the reactor with the new fuel element and control rod with no necessity of gaining access to the tubular member within the reactor.

Figures 3A, 3B:
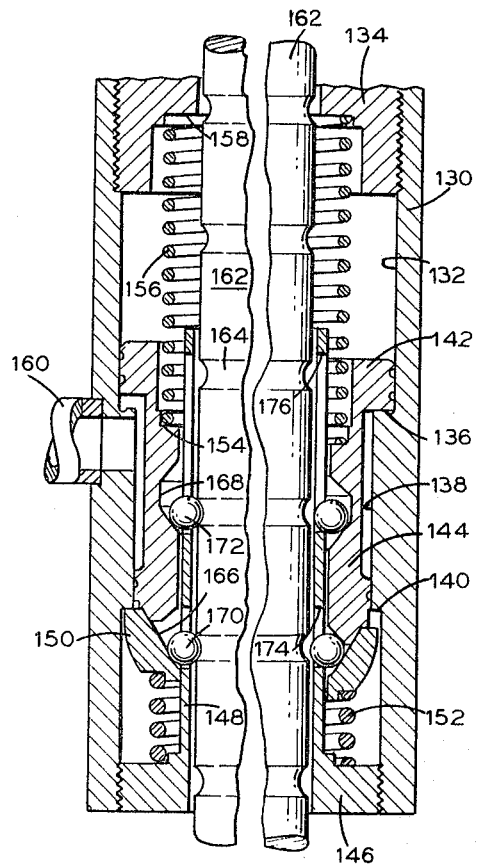
FIG. 3A is a partial section of a third embodiment of a control rod actuator assembly showing both of the coupling means engaging the control rod.
FIG. 3B is a partial section showing both coupling means disconnected from the control rod.

A third embodiment of the present invention is illustrated in FIGS. 3A and B wherein ball members are incorporated, similar to the embodiment shown in FIG. 1 as the coupling means, while two coupling means are employed similar to the embodiment illustrated in FIG. 2. However, in this embodiment the ball members are arranged to positively engage the control rod. Thus the actuator shown in FIGS. 3A and B comprises a cylinder member 130 having a cylindrical inner surface 132 extending downwardly from an upper end member 134 to an inwardly extending shoulder 136 which leads to a smaller diameter cylindrical surface 138 extending downwardly therefrom to a second shoulder 140. A piston member 142, having an upper end with a diameter substantially equal to that of surface 132, is arranged in sealed sliding engagement therewith. The lower end 144 of the piston member 142 has a smaller diameter and is in sealed sliding engagement with the cylindrical inner surface 138 of cylinder member 130. The length of the piston member 142 is such that when the upper end thereof is abutting shoulder 136 the lowermost end extends below shoulder 140. The lower end of cylinder 130 is closed by plate member 146 which is provided with a tubular portion 148 which extends upwardly therefrom co-axially within cylinder 130, terminating above shoulder 136. An annular locking collar 150 is disposed around the lower end of tubular portion 148 and is urged in abutting relationship with shoulder 140 by spring 152 which seats on the inner surface of plate member 146. The upper end of piston member 142 is provided with a spring seat 154 which accommodates spring 156 which extends downwardly from a seating surface 158 in the upper end member 134. The actuating fluid transfer line 160 opens through the wall of cylinder 130 into the annular space between inner surface 138 of the cylinder and piston 142.

The control rod or follower rod 162 utilized with this actuator arrangement is provided with a plurality of circumscribing grooves 164 at evenly spaced intervals along its length. The spacing of adjacent grooves is selected to provide the desired rod motion increments. Locking collar 150 is provided with a beveled inner seating surface 166 and the inner surface of piston 142 also has a similar beveled seating surface 168 which, in co-operation with the grooves 164 in the control rod, hold a plurality of ball members 170 and 172 respectively which project through slots 174 and 176 in the tubular extension member 148 and operate as the coupling means. As shown in FIG. 3A, when the piston is in a neutral position with no actuator fluid being transferred through line 160, retaining collar 150 is urged into abutment with shoulder 140 by spring 152, holding a series of balls 170 in a first groove of the control rod. The lower end 144 of the piston is seated on the upper surface of the locking collar 150, with seating surface 168 holding balls 172 in the next superjacent groove of the control rod. In this condition, the control rod is securely locked in position. Upon the introduction of an actuating fluid through line 160, at a pressure above the environment in which the the actuator is disposed, piston 142 is moved upwardly against the force of spring 156. Thus, seating surface 168, on the inner surface of the piston, holding balls 172 in engagement with the groove 164 of the control rod, moves the balls and the control rod upward. During this movement the balls 170 are free to move upwardly and inwardly along surface 166 in the locking collar, thereby disengaging the control rod and permitting it to move upwardly. When the next subjacent groove in the control rod comes into alignment with seat 166 in the locking collar, the piston will be in its uppermost position and as the actuating fluid flow is terminated and the piston starts to return to the original position under the influence of spring 156, balls 170 re-engage the control rod, holding it stationary while piston 142 and its associated balls 172 return to the starting position shown in FIG. 3A.

When it is desired to lower the control rod, a negative pressure is imposed upon transfer line 160 causing piston 142 to move downwardly into abutment with shoulder 136 as shown in FIG. 3B. As the piston moves downwardly the lower end 144 forces locking collar 150 downwardly under either the influence of gravity or the fluid tions of seating surfaces 168 and 166 are brought into alignment with the balls 172 and 170, permitting them to move outwardly from engagement with the grooves in the control rod and permitting the rod to move downwardly under either the influence of gravity of the fluid pressure differential between the top and the bottom of the reactor.

Figure 4:
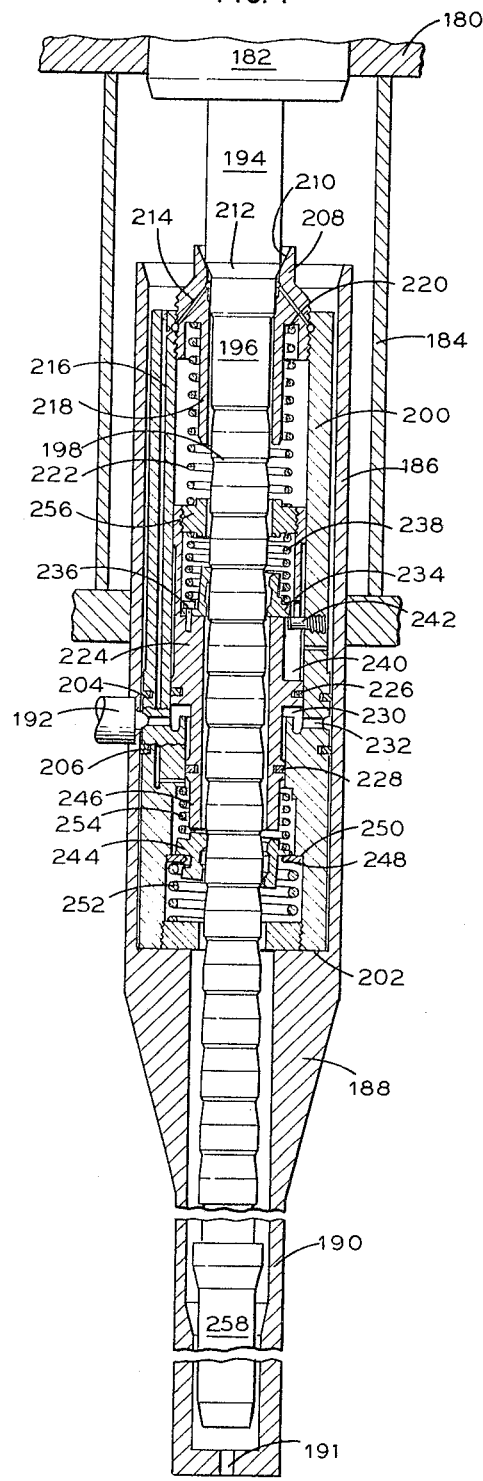
FIG. 4 is a further embodiment of the present invention.

A further embodiment of the present invention is illustrated in FIG. 4 wherein the lower fuel element support plate 180 of a reactor is illustrated with the lower end of the fuel element 182 extending therethrough. An actuator support bracket 184 is suspended from the lower face of plate 180 and is connected to an actuator support member 186 which is tubular in shape and open at the top. The tubular support member 186 is connected at the bottom by a transition piece 188 to a tubular follower rod housing 190. A small opening 191 is provided in the lowermost end of the follower rod housing. An actuator fluid transfer line 192 is provided through the tubular actuator support member 186. The lower end of a nuclear control rod 194 is shown extending downwardly from the lower end of the fuel element 182. The control rod is connected at its lower end to a follower rod 196 which is provided with a plurality of shoulders 198 spaced axially along the length thereof.

The control rod actuator comprises a cylinder member 200 arranged to slidably fit within tubular member 186 and resting at its lower extremity on shoulder 202 formed by transition piece 188. The cylinder is provided with a pair of fluid sealing rings 204 and 206, arranged to effect a seal between the cylinder and tubular member 186 on either side of transfer line 192. The upper end of cylinder member 200 is provided with an end closure 208 which is provided with a seating surface 210 arranged to mate with beveled surface 212 on the lower end of the control rod. A small fluid line 214 opens into the inner bore of end closure 208 below seat 210 and extends into fluid passageway 216 which extends downwardly through the wall of the cylinder member 200 to beneath the transfer line 192 where it opens to the inner surface of the cylinder member. The end closure member 208 is also provided with a downwardly extending tubular portion 218 with an inside diameter slightly larger than the outside diameter of control rod 196. A recess in the depending portion 218 forms a seat 220 for spring 222. The piston member 224 of this construction is disposed within the cylinder member 200 and is provided with seals 226 and 228 forming an annular piston chamber 230 which is in communication with the transfer line 192 via openings 232 through the side of the cylinder member 200. The inner diameter of the cylinder 200 is reduced in the vicinity of the transfer line 192 and the diameter of the piston is correspondingly reduced. A first coupling means comprising a jacking collar 234 is disposed in the upper portion of the piston member and is located by bolt 236. The jacking collar 234 may tilt or pivot about one edge which is located by bolt 236 and is biased into engagement with one shoulder 198 of the follower rod by spring 238. One side of the piston member is provided with a slot 240 beneath the jacking collar to accommodate fixed stop pin 242 during movement of the piston member. The second coupling means or locking collar 244 is supported in the lower end of the cylinder member just subjacent the lower end 246 of piston 224 by a washer member 248 retained against shoulder 250 in the lower portion of the cylinder by spring 252. The locking collar 244 is arranged to pivot about one edge into and out of engagement with the shoulders 198 of follower rod 196. The locking collar is normally urged into engagement with the follower rod by spring 254.

In operation, the actuator illustrated in FIG. 4 operates substantially like that shown in FIG. 2 except that the coupling means positively engage shoulders 198 on the follower rod. Thus, as actuator fluid is supplied through transfer line 192 to chamber 230 below piston 224, the piston and jacking collar 234 are moved upwardly raising the control rod until the upper end of the stroke is reached, as when the upper end 256 of the piston 224 abuts the lower end of the downwardly extending tubular portion 218 of end closure 208. During this movement locking collar 244 is free to pivot around one side of washer member 248 against spring 254 permitting the follower rod to be moved upwardly by the piston. As the piston reaches the upper end of its stroke, the follower rod has moved sufficiently upward for the next subjacent shoulder to be engaged by locking collar 244. The follower and control rods are then held stationary by the locking collar while the piston is returned to its original position by spring 222 when the actuating fluid flow is stopped, or the pressure reduced. Thus, by using a pulsed source of actuating fluid, it is possible to rapidly move the control rod upwardly out of the reactor core. When a negative pressure is imposed upon transfer line 192, the piston member is drawn downwardly within the cylinder 200 until stop pin 242 engages the jacking collar 234 tilting it, against the force of spring 238, out of engagement with the control rod. At the same time, the lower end 246 of the piston has engaged the upper edge of locking collar 244 forcing it downwardly against the action of spring 252 releasing the follower rod for downward motion of the control rod into the core. It will be noted that as the lower end 258 of the follower rod enters the lowermost portion of follower rod housing 190 it encounters an increased flow resistance due to the decrease in clearance dimensions. Thus, the lower end of the follower rod housing operates as a snubber to decelerate the follower rod and the control rod at the lower end of their travel.

The position of the control rod can be readily determined by counting the number of pulses applied to the actuator fluid transfer line. To verify the location of the control rod, it may be periodically "exercised." It may be scrammed by applying a sustained negative pressure to transfer line 192. Upon the application of negative pressure the lower seal 228 on the piston is below the lower end of fluid passageway 216 so that a small amount of fluid is drawn from the upper end of the cylinder via opening 214. The amount of fluid passing through passageways 214 and 216 is not sufficient to permit the piston to return to its normal position but is enough to limit the negative pressure which may be applied via transfer line 192. When the control rod reaches the full down position, shoulder 212 engages seat 210 on the upper end of the cylinder shutting off passageway 214 from any further flow therethrough. At this time, the negative pressure in line 192 will substantially increase over that previously encountered, indicating that the control rod is in the full down position. The number of positive fluid pulses may then be counted to locate the control rod as desired. On the other hand, if the control rod is near the upper end of its travel and it is desired to move the control rod to the full up position, the actuator fluid is supplied in pulses through transfer line 192 to operate the piston and move the control rod upwardly until the lower end 258 of the follower rod engages the lower end of the cylinder, at which time no further upward motion of piston 224 is possible. At that time, the pressure in line 192 will increase substantially over that previously registered, indicating that the control rod is then in its uppermost position.

With the actuator arrangements of the present invention a simple rugged control rod drive is provided which may be positioned within the reactor without the harmful consequences associated with prior actuators. Moreover, with the arrangements of the present invention any malfunction in the actuator fluid line or in the reactor coolant system cannot completely drive the control rods up and out of the reactor core. While a malfunction could conceivably cause the control rods to be inserted into the core, this provides a fail safe arrangement which is highly desirable in nuclear reactor constructions. It should be noted that the only motion of a control rod up and out of the reactor core that is possible with the actuators of the present invention during a malfunction of the actuator system is limited to one increment of piston motion, which is not likely to cause the severe hazard possible when it is possible for the control rods to be accidentally completely removed from the reactor core.

While the actuators of the present invention have been specifically directed to the movement of control rods into and out of reactor cores, it will be appreciated that these actuators may be applied to any other linear motion device requiring simple rugged mechanisms which are substantially fail safe.

What is claimed is:

1. A nuclear control rod actuator for a control rod of constant diameter comprising a control rod, an elongated cylinder member arranged for the passage of said control rod therethrough, a fluid-actuated piston movably disposed for reciprocation in first and second longitudinal directions within said cylinder member, coupling means associated with said piston arranged to engage said constant diameter control rod and to move said control rod with said piston within said cylinder member in said first direction, means arranged to release said coupling means from said control rod during initial reverse movement of said piston in said second direction opposite to said first direction, means for maintaining said control rod stationary during predetermined normal movement of said piston in said second direction, and means for rendering said maintaining means inoperative at the end of said predetermined normal movement of said piston in said second direction, and means for transferring an actuating fluid to reciprocate said piston within said cylinder member, said maintaining means being rendered inoperative during sustained motion of said piston beyond said predetermined normal movement in said second direction.

2. A nuclear control rod actuator according to claim 1 wherein said coupling means is carried by said piston and said piston and said coupling means surround said control rod.

3. A nuclear control rod actuator according to claim 1 wherein said piston is spring-biased toward a neutral position.

4. A nuclear control rod actuator according to claim 1 wherein said cylinder is removably positioned in a containment chamber within a nuclear reactor.

5. A nuclear control rod actuator according to claim 1 wherein said maintaining means includes a second coupling means disposed within said cylinder member arranged to operate independently of said piston during normal movement thereof.

6. A nuclear control rod actuator according to claim 5 wherein said first and second coupling means positively engage said control rod.

7. A nuclear control rod actuator according to claim 5 wherein said first and second coupling means are normally spring-biased into engagement with said control rod.

8. A nuclear control rod actuator according to claim 5 wherein said piston has a substantially cylindrical shape with said coupling means being disposed therein.

9. A nuclear control rod actuator according to claim 5 wherein said piston has a portion extending downwardly from the lower surface thereof, which portion is arranged to disengage said second coupling means from said control rod when said piston is moved beyond said normal movement in said second direction.

10. A nuclear control rod actuator according to claim 9 wherein movement of said piston in said first direction is only a minor portion of possible movement of said control rod.

References Cited

UNITED STATES PATENTS 2,797,110    6/1957    Covington _____ 176—36

FOREIGN PATENTS 963,215    7/1964    Great Britain.
617,406    2/1961    Italy.

OTHER REFERENCES

German application 1,123,057.

L. DEWAYNE RUTLEDGE, *Primary Examiner.*

H. E. BEHREND, *Assistant Examiner.*